US008270641B1

(12) United States Patent
Greenberg

(10) Patent No.: US 8,270,641 B1
(45) Date of Patent: Sep. 18, 2012

(54) MULTIPLE AUDIO SIGNAL PRESENTATION SYSTEM AND METHOD

(75) Inventor: Robert Y. Greenberg, Portland, OR (US)

(73) Assignee: Pixelworks, Inc., Portland, OR (US)

(*) Notice: Subject to any disclaimer, the term of this patent is extended or adjusted under 35 U.S.C. 154(b) by 1405 days.

(21) Appl. No.: 11/258,727

(22) Filed: Oct. 25, 2005

(51) Int. Cl.
*H04R 5/02* (2006.01)

(52) U.S. Cl. ......... 381/306; 381/307; 381/104; 381/107

(58) Field of Classification Search .......... 381/104–109, 381/101–102, 306–307, 61, 86, 302
See application file for complete search history.

(56) References Cited

U.S. PATENT DOCUMENTS

| | | | | |
|---|---|---|---|---|
| 6,195,435 | B1* | 2/2001 | Kitamura | 381/18 |
| 6,807,281 | B1* | 10/2004 | Sasaki et al. | 381/111 |
| 7,277,551 | B2* | 10/2007 | Miura et al. | 381/98 |
| 7,277,561 | B2* | 10/2007 | Shin | 382/117 |
| 7,305,097 | B2* | 12/2007 | Rosen et al. | 381/307 |
| 7,636,930 | B2* | 12/2009 | Chang | 725/75 |
| 2004/0013277 | A1* | 1/2004 | Crocitti et al. | 381/109 |
| 2006/0204022 | A1* | 9/2006 | Hooley et al. | 381/117 |

* cited by examiner

*Primary Examiner* — Disler Paul
(74) *Attorney, Agent, or Firm* — Marger Johnson & McCollom, P.C.

(57) ABSTRACT

I describe and claim a multiple audio signal presentation system and method. The multiple audio signal presentation system includes a presentation system to present a plurality of audio signals, and a controller to manipulate one or more of the audio signals, where the audio signals, when concurrently presented by the presentation system, are audibly differentiable responsive to the manipulation.

30 Claims, 5 Drawing Sheets

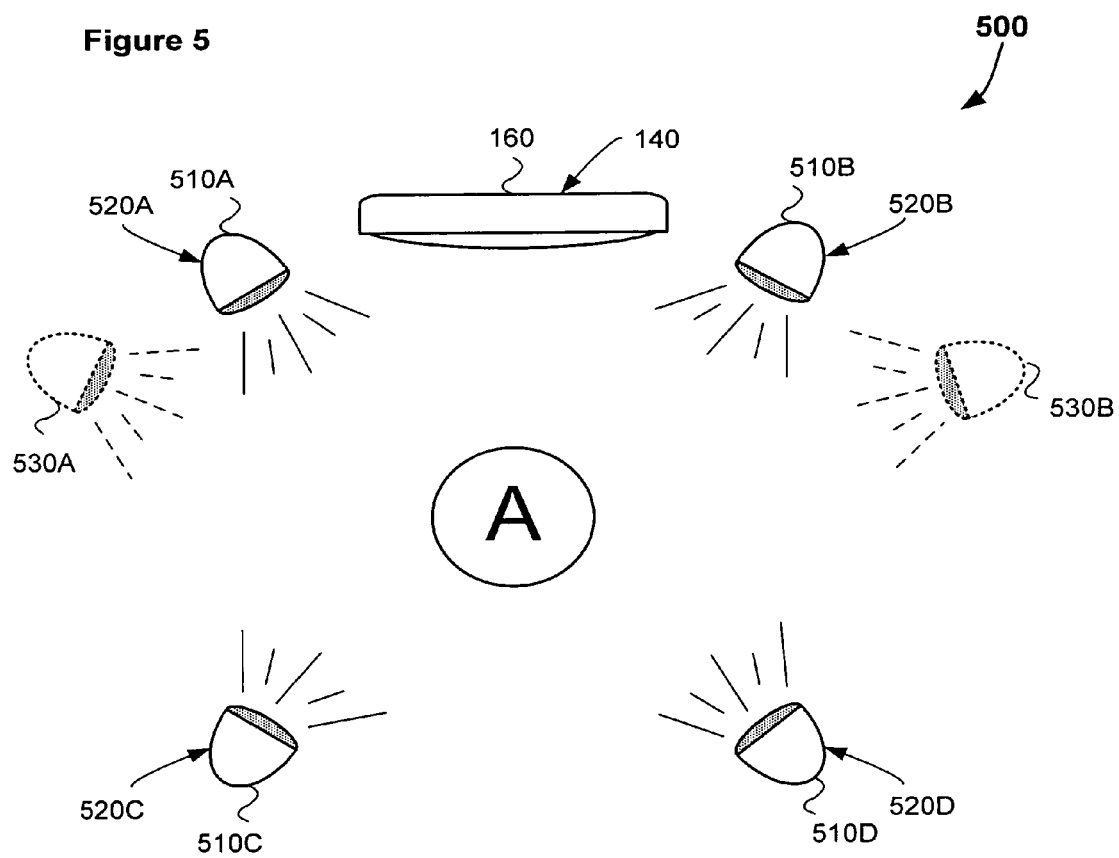

MULTIPLE AUDIO SIGNAL PRESENTATION SYSTEM AND METHOD

FIELD OF THE INVENTION

This invention relates to audio presentation and, more specifically, to a system and method for concurrently presenting multiple audio signals.

BACKGROUND OF THE INVENTION

Picture-in-picture (PIP) is a common television and display feature that allows a user to concurrently display two video streams in a single display area. The display area typically includes primary and secondary display windows for displaying the video streams, where the primary display window generally occupies a larger portion of the display area than the secondary display window. One of the video streams is typically designated as the primary stream and thus is displayed in a primary display window. The other (secondary) video stream is shown in the secondary display window, which may overlap or be positioned in a side-by-side orientation with the primary display window.

Each of the video streams typically has an accompanying audio stream. Conventional PIP applications only present the audio stream corresponding to the primary video stream, since straight-mixing of multiple audio streams produces an unintelligible result. In order to listen to the secondary audio stream, the user is typically required to manually change the primary video stream designation, which is inconvenient and often includes a switching-delay that causes the user to miss valuable audio information. Thus the need remains for a system and method to concurrently present multiple audio streams that are perceptively distinguishable by an audience.

BRIEF DESCRIPTION OF THE DRAWINGS

The foregoing and other objects, features, and advantages of the invention will become more readily apparent from the following detailed description of embodiments that proceeds with reference to the following drawings.

FIGS. 4 and 5 are block diagrams of multi-audio channel presentation systems useful with embodiments of the present invention.

DESCRIPTION OF THE INVENTION

In the field of audio presentation, the ability to concurrently present multiple audio signals, each capable of distinct perception by an audience, is advantageous. As described above, prior presentation systems only present one audio signal at a time, as the straight-mixing of the multiple audio signals would render the resulting auditory compilation incomprehensible. By intelligently manipulating one or more of the audio signals prior to presentation, however, embodiments of the present invention allow the audience to distinguish and/or differentiate among the concurrently presented audio signals. Embodiments of the present invention will now be described in more detail.

Figure 1:
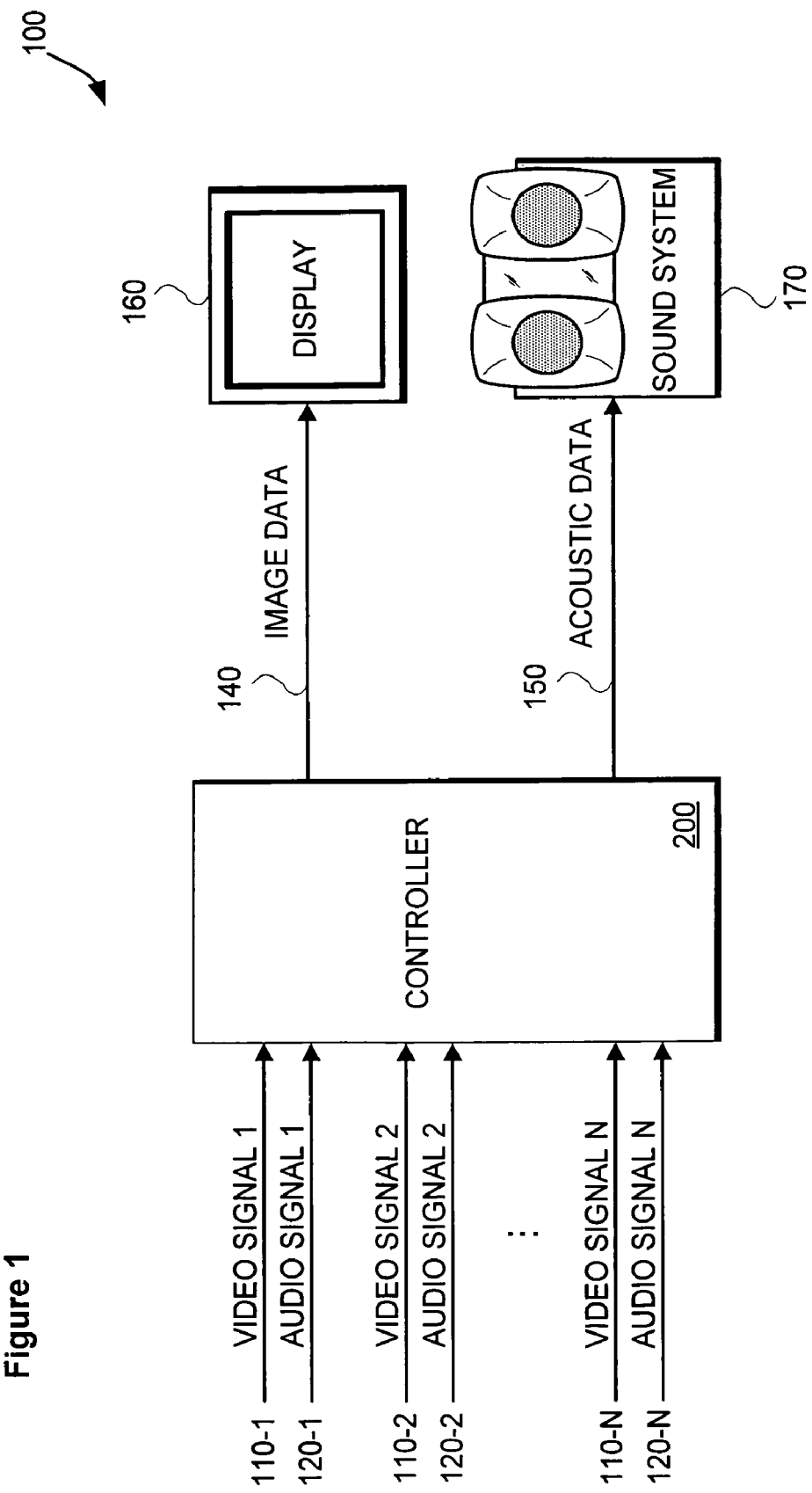
FIG. 1 is a block diagram of a system useful with embodiments of the present invention.

FIG. 1 is a block diagram of a system 100. Referring to FIG. 1, the system 100 includes a controller 200 to receive a plurality of video signals 110-1 to 110-N for visual display by a display device 160. The video signals 110-1 to 110-N may be in a variety of formats, including composite or component video. Composite video describes a signal in which luminance, chrominance, and synchronization information are multiplexed in the frequency, time, and amplitude domain for single wire transmission. Component video, on the other hand, describes a system in which a color picture is represented by a number of video signals, each of which carries a component of the total video information. In a component video device, the component video signals are processed separately and, ideally, encoding into a composite video signal occurs only once, prior to transmission. A person of skill in the art understands the variety of devices, manners, and sources in which the video signals 110-1 to 110-N may be generated from and provided to the controller 200.

The controller 200 generates image data 140 responsive to the video signals 110-1 to 110-N and provides the image data 140 to the display 160. The image data 140 may be configured so that the display device 160 distinctly displays each of the video signals 110-1 to 110-N, e.g., using a picture-in-picture format with separate display windows for each video signal 110-1 to 110-N. The controller 200 may also generate and provide control signals (not shown) to the display 160 to assist in the display of image data 140. The controller 200 may be integrated into a monolithic integrated circuit or hard-wired using any number of discrete logic and other components. Alternatively, the controller 200 may be a dedicated processor system that includes at least one microcontroller and/or microprocessor to implement one or more software programs or algorithms.

The display device 160 may include a pixelated display that has a fixed pixel structure. Examples of pixelated displays are active and passive LCD displays, plasma displays (PDP), field emissive displays (FED), electro-luminescent (EL) displays, micro-mirror technology displays, low temperature polysilicon (LTPS) displays, and the like. A person of reasonable skill in the art should recognize that display 160 may be a television, monitor, projector, personal digital assistant, and other like applications. Although FIG. 1 shows a display 160, any device capable of displaying image data 140 or video signals 110-1 to 110-N may be used into system 100.

The controller 200 also receives a plurality of audio signals 120-1 to 120-N, each capable of acoustic presentation by a sound system 170. The audio signals 120-1 to 120-N may accompany the corresponding video signals 110-1 to 110-N, e.g., to form a plurality of audio-video signal pairs. Or the audio signals 120-1 to 120-N may be provided independently of the video signals 110-1 to 110-N. In some embodiments, the audio-video pairs may be provided to controller 200 in distinct signals, where the controller 200 may separate the audio and video components of each audio-video pair upon receipt. Although FIG. 1 shows the controller 200 receiving an equal number of audio signals 120-1 to 120-N and video signals 110-1 to 110-N, embodiments of the present invention are not so limited. For instance, the controller 200 may receive one or more of the audio signals 120-1 to 120-N without an accompanying video signal 110-1 to 110-N, or may receive multiple audio signals 120-1 to 120-N corresponding to a single video signal, or multiple video signals 110-1 to 110-N corresponding to a single audio signal. The controller 200 may also include an application for synchronizing the display of the video signals 110-1 to 110-N with the presentation of the corresponding audio signals 120-1 to 120-N.

The controller 200 generates acoustic data 150 responsive to the audio signals 120-1 to 120-N, and provides the acoustic data 150 to the sound system 170. The acoustic data 150 may include data representing each of the audio signals 120-1 to 120-N, and configured to allow an audience to audibly-differentiate among the audio signals 120-1 to 120-N when presented by the sound system 170. Embodiments of the controller 200 will be described below in greater detail with reference to FIGS. 2-5.

The sound system 170 may include a one or more acoustic speakers, and/or other presentation devices capable of presenting the acoustic data 150. When the sound system 170 includes multiple presentation devices and/or acoustic speakers, a person of skill in the art understands there are many arrangements and/or configurations available to spatially separate the multiple presentation devices. The controller 200 and sound system 170 may also support a single audio channel and/or multi-channel applications, e.g., stereo or 5.1 surround sound functionality.

Figure 2:
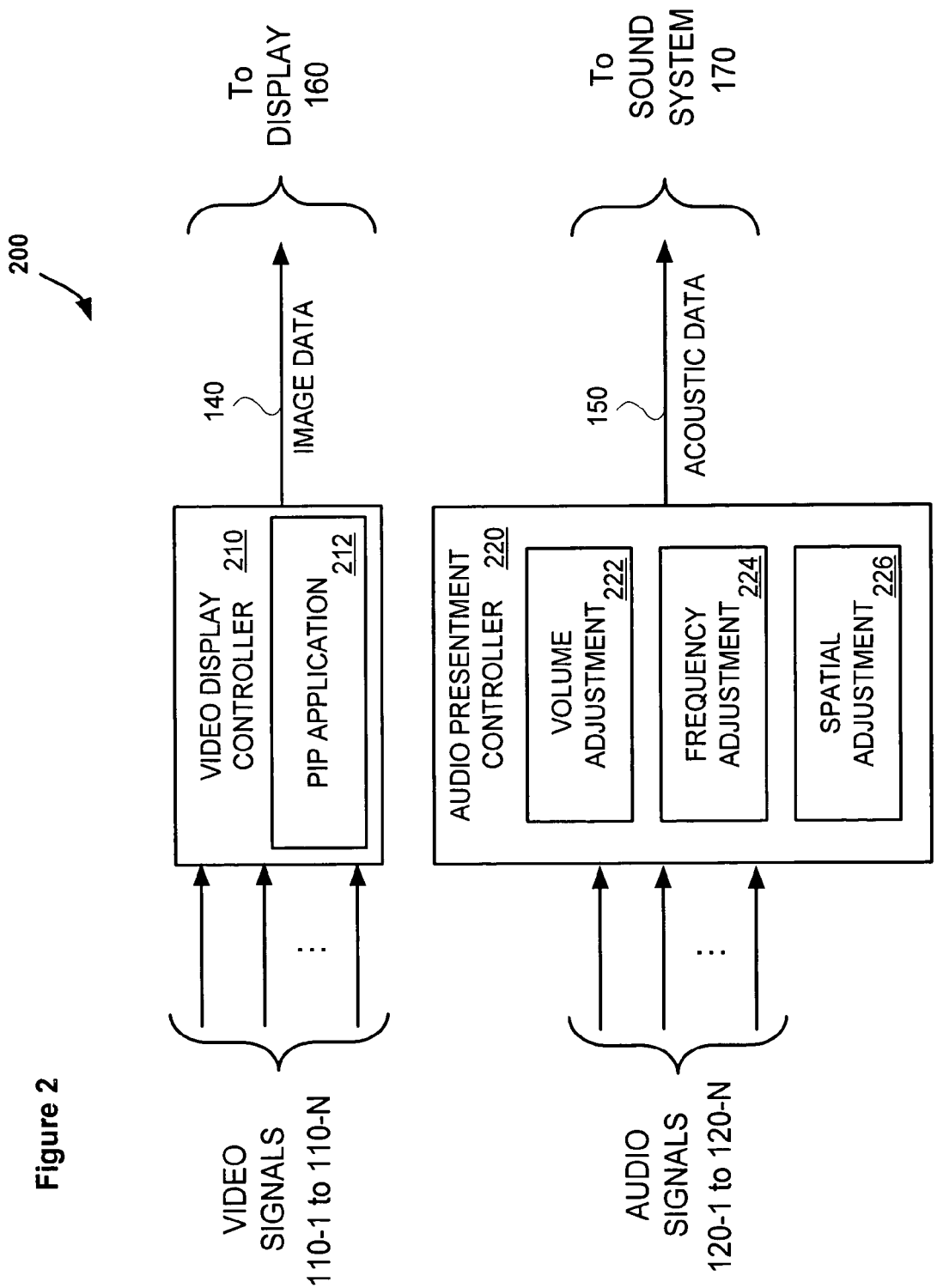
FIG. 2 is a block diagram illustrating embodiments of the controller shown in FIG. 1.

FIG. 2 is a block diagram of an embodiment of the controller 200 shown in FIG. 1. Referring to FIG. 2, the controller 200 includes a video display controller 210 to generate image data 140 responsive to video signals 110-1 to 110-N, and provide the image data 140 to the display device 160. The image data 140 may be configured so that the display device 160 distinctly displays each of the video signals 110-1 to 110-N, e.g.; using a picture-in-picture format with separate display windows for video signals 110-1 to 110-N. The video display controller 210 may also perform other image processing on the video signals 110-1 to 110-N in the generation of image data 140. In an embodiment, the video display controller 210 may scale the video signals 110-1 to 110-N prior to display using a variety of techniques including pixel replication, spatial and temporal interpolation, digital signal filtering and processing, and the like. In another embodiment, the video display controller 210 may additionally change the resolution of the video signals 110-1 to 110-N, changing the frame rate and/or pixel rate encoded in the video signals 110-1 to 110-N. A person of reasonable skill in the art should recognize a multitude of other processing functionality that may be incorporated into video display controller 210, including, e.g., Y/C separation, de-interlacing, temporal filtering, edge enhancement, and the like.

The controller 200 includes an audio presentment controller 220 to generate the acoustic data 150 responsive to the audio signals 120-1 to 120-N, and to provide the acoustic data 150 to the sound system 170. The acoustic data 150, when presented by the sound system 170, allows an audience to distinctly perceive auditory-representations for each of the audio signals 120-1 and 120-N. In other words, an audience listening to the presentation of the acoustic data 150 would be able to perceive and distinguish among the presented audio signals 120-1 to 120-N. Although controller 200 is shown to include both the video display controller 210 and audio presentment controller 220, in some embodiments controllers 210 and 220 may be located in different modules or systems, or employed independently of each other.

The audio presentment controller 220 may manipulate one or more of the audio signals 120-1 to 120-N, so that the audio signals 120-1 to 120-N, when concurrently presented by the sound system 170, are audibly differentiable responsive to the manipulation. The audio presentment controller 220 is capable of implementing several manipulation techniques. For instance, the audio presentment controller 220 may perform a volume adjustment 222 to set the presentment volumes of corresponding audio signals 120-1 to 120-N to differing intensity levels. The audio presentment controller 220 may set the presentment volumes by adjusting at least one the audio signals 120-1 to 120-N, or by controlling the presentation functionality of the sound system 170. Since an audience may distinguish among the auditory presentations of differing volume intensity levels, the system 100 may concurrently present the multiple audio signals 120-1 to 120-N so they are each distinctly intelligible.

Another manipulation technique is a frequency adjustment 224, which separates the audio signals 120-1 to 120-N in the frequency domain. Since an audience may distinguish among audio signals 120-1 to 120-N presented with differing frequency ranges, the system 100 may concurrently present the frequency separated audio signals 120-1 to 120-N so they are each distinctly intelligible. The audio signals 120-1 to 120-N need not be discretely separated, i.e., some frequency overlap may be permitted, so long as the audio signals 120-1 to 120-N remain audibly-differentiable when concurrently presented.

The audio presentment controller 220 may perform this frequency separation by adjusting the frequencies of at least one of the audio signals 120-1 to 120-N. For example, when two audio signals, e.g., N=2, are provided to the audio presentment controller 220, the audio presentment controller 220 may shift a first audio signal to occupy within a higher audible frequency range, while maintaining the second audio signal within a lower range of audible frequencies. In some embodiments, the audio presentment controller 220 may further remove higher frequency data from the second audio signal, e.g., the data present at frequencies exceeding a predetermined threshold. The predetermined threshold may delineate the lower boundary of the higher frequency range, or be set to allow some frequency range overlap, so long as the presented audio signals 120-1 to 120-N are audibly-differentiable. The audio presentment controller 220 may clip the first audio signal to reside within an audible voice frequency band prior to the shift. These additional manipulations may minimize the frequency overlap of the two audio signals, and thus preserve presentation intelligibility.

When system 100 includes multi-audio channel functionality, e.g., stereo or 5.1 surround sound, the audio presentment controller 220 may implement a spatial adjustment 226 manipulation technique. The spatial adjustment 226 permits the audio presentment controller 220 to direct the audio signals 120-1 to 120-N to be presented in spatially-distinct locations within the sound system 170. For instance, the sound system 170 may include a plurality of spatially-separated sound presentation devices and the audio presentment controller 220 may direct the sound system 170 to present the audio signals 120-1 to 120-N with one or more subsets of the sound presentation devices. In some embodiments, the audio presentment controller 220 may direct the sound system 170 to stereophonically present the audio signals 120-1 to 120-N so that the presentations perceptively-appear to originate from spatially-distinct locations. Example embodiments of the spatial adjustment 226 will be shown below in FIGS. 4 and 5.

Figure 3:
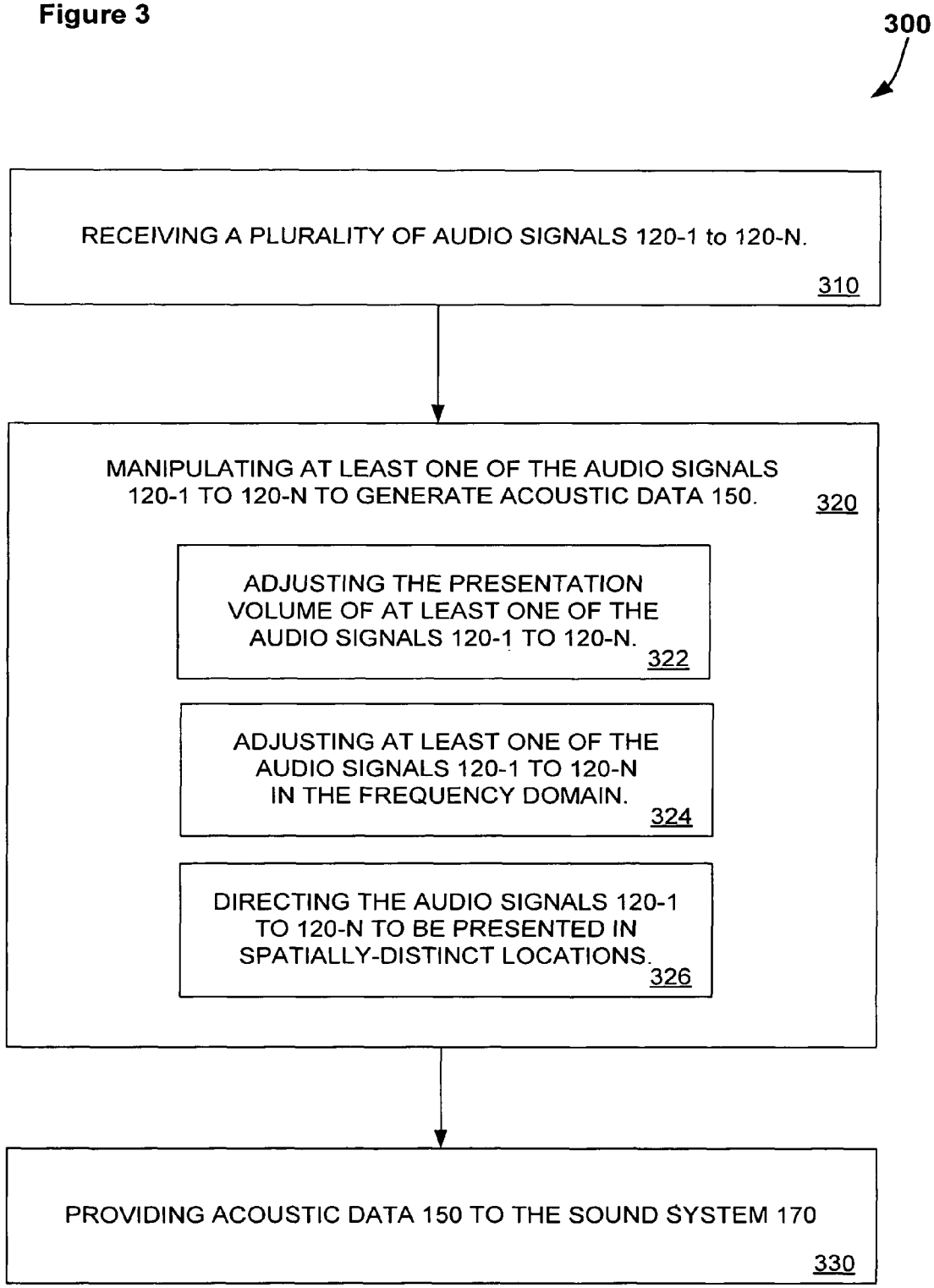
FIG. 3 is a flowchart example of operational embodiments for the controller shown in FIG. 1.

FIG. 3 is an example flowchart 300 of embodiments for the operation of controller 200 shown in FIG. 1. Referring to FIG. 3, the controller 200 receives a plurality of audio signals 120-1 to 120-N (block 310), manipulates at least one of the audio signals 120-1 to 120-N to generate acoustic data 150 (block 320), and provides the acoustic data 150 to sound system 170 (block 330). The acoustic data 150, when presented by the sound system 170, produces individually intelligible auditory-representations of each audio signal 120-1 to 120-N.

The controller 200 may manipulate the audio signals 120-1 to 120-N by adjusting the presentation volume of at least one of the audio signals 120-1 to 120-N (block 322). For instance, the controller 200 may adjust the volumes of the audio signals 120-1 to 120-N so they are presented at different intensity levels, thus allowing an audience to differentiate among the presentations.

The controller 200 may manipulate the audio signals 120-1 to 120-N by adjusting at least one of the audio signals 120-1 to 120-N in the frequency domain (block 324). For instance, the controller 200 may frequency-shift one or more of the audio signals 120-1 to 120-N so they reside in differing frequency ranges. To aid in audience differentiation upon presentation, the controller 200 may additionally clip one or more of the audio signals 120-1 to 120-N to include only human voice data, and/or selectively remove data from at frequencies which overlap other audio signals 120-1 to 120-N.

The controller 200 may further manipulate the audio signals 120-1 to 120-N by directing the audio signals 120-1 to 120-N to be presented in spatially-distinct locations (block 326). Embodiments of block 326 will be described in detail below in FIGS. 4 and 5. The audio presentment controller 220 may perform each of these manipulations (blocks 322, 324, and 326) individually, or in concert.

Figure 4:
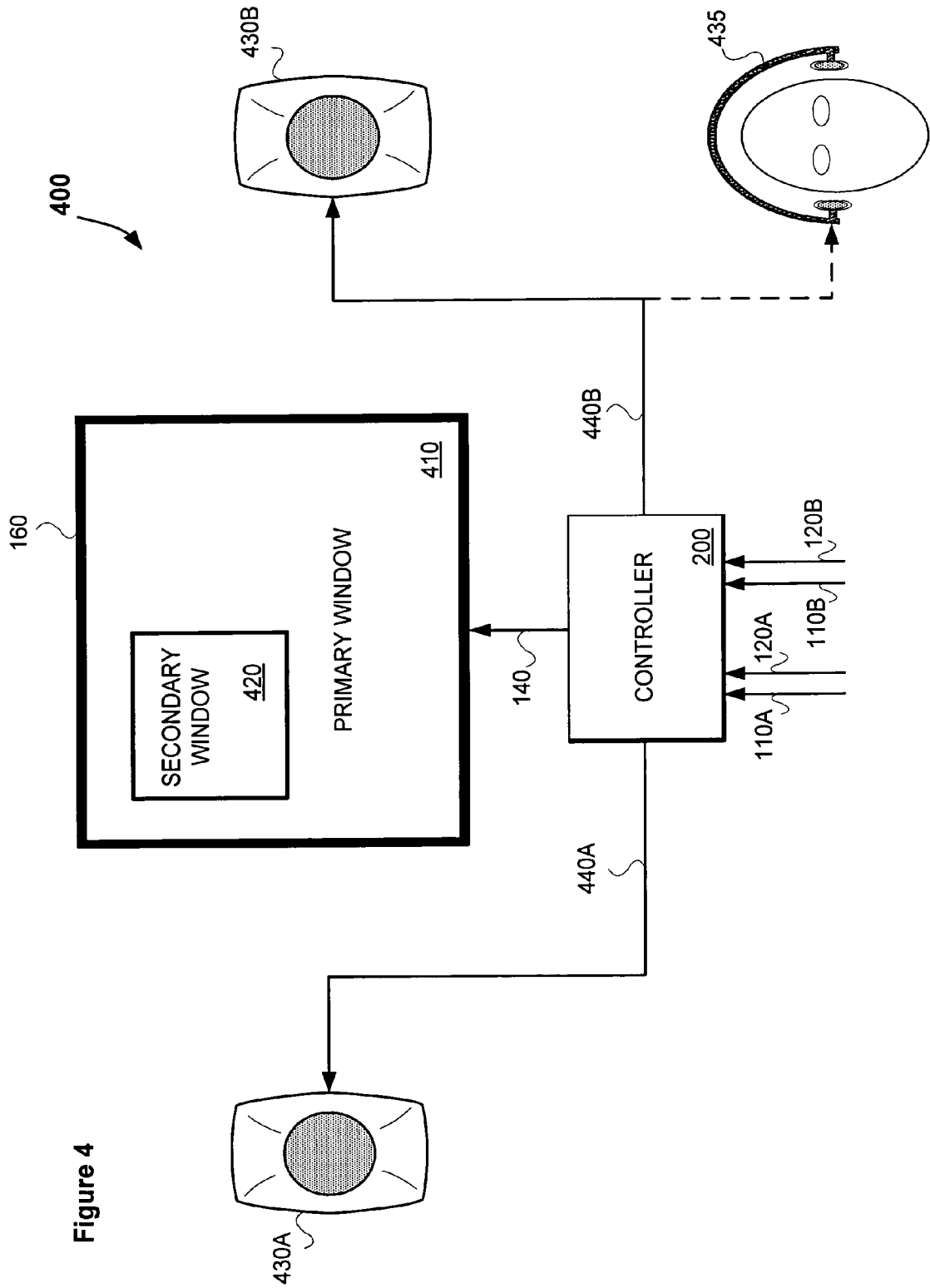

FIGS. 4 and 5 are block diagrams of multi-audio channel presentation systems useful with embodiments of the present invention. Referring to FIG. 4, a system 400 includes a controller 200 to provide a plurality of video signals 110A and 110B to a display 160 as image data 140. The display 160 may concurrently display the video signals 110A and 110B in separate display windows, e.g., primary window 410 and secondary window 420. Although the display shows the secondary window 420 overlapping the primary window 410, a person of skill in the art understands the display 160 may implement many other window configurations.

The system 400 includes a plurality of audio channels 440A and 440B to respectively couple a plurality of presentation devices 430A and 430B to controller 200. The presentation devices 430A and 430B are physically separated and may present audio data received over audio channels 440A and 440B, respectively. For instance, when the controller 200 provides audio signal 120A to presentation device 430A over audio channel 440A and provides audio signal 120B to presentation device 430B over audio channel 440B, the presentation devices 430A and 430B may respectively present the audio signals 120A and 120B at separate physical locations. Since an audience may distinguish among audio presentations originating from different directions, system 400 may concurrently present both of the audio signals 120A and 120B without loss of intelligibility.

In some embodiments, the controller 200 may direct a stereophonic presentation of one or more of the audio signals 120A and 120B. This allows the audience to perceive distinct origination points for audio signals 120A and 120B even though they may be presented from one or more common physical locations, i.e., from the presentation devices 430A and 430B. For instance, the controller 200 may direct presentation devices 430A and 430B to stereophonically present audio signal 120A so the presentation of the audio signal 120A appears to originate left of display 160, while the audio signal 120B may be presented by one or more of the same presentation devices 430A and 430B and appear to originate from a perceptibly distinct location. Embodiments of stereophonic presentation will be described in greater detail below in FIG. 5.

The presentation devices 430A and 430B may be any device capable of presenting audio data, e.g., a speaker, or a group of speakers. In some embodiments, one or more of the presentation devices 430A and 430B may be an individual-usage device 435, e.g., headphone, headset, earpiece, or any other device to present audio data to an individual or any subset of a listening audience. The addition or substitution of the individual-usage device 435 to system 400 may, in some embodiments, allow one user to watch primary window 410 and listen to the corresponding presentation from device 430A, while another user watches the secondary window 420 and listens to the corresponding presentation from the individual-usage device 435.

Referring to FIG. 5, a system 500 includes a display 160 to display image data 140 to an audience A. The image data 140 may include multiple video signals to be concurrently presented, e.g., in a picture-in-picture application. The system 500 also includes a plurality of presentation devices 510A, 510B, 510C, and 510D that are spatially separated, e.g., positioned at the 4-corners of a square. The square arrangement shown in FIG. 5 is but one possible arrangement of the presentation devices 510A, 510B, 510C, and 510D, a person of skill in the art understands there are many configurations and/or arrangements available that allow the audience A to perceive their presentations.

The system 500 may concurrently present multiple audio signals so the audience A perceives them to originate from distinct locations. For instance, one audio signal may be presented by the presentation devices 510A and 510B next to the display 160, e.g., with audio data 520A and 520B, while another audio signal may be presented by the presentation devices 510C and 510D across from the display, e.g., with audio data 520C and 520D. In other embodiments, the signal presentations may be separated by a left-right division, where one signal is presented by left presentation devices 510A and 510C and the other signal is presented by the right presentation devices 510B and 510D.

The system 500 may further stereophonically present one or more of the audio signals so they perceived by the audience A to originate from separate locations. For instance, one audio signal may be presented by a subset of presentation devices 510A, 510B, 510C, and 510D so the audience A perceives the presentation to originate at location 530A. Another audio signal may concurrently be presented by a subset of the presentation devices 510A, 510B, 510C, and 510D so the audience A perceives the presentation to originate at location 530B. A stereophonic presentation may be achieved by delaying presentation of an audio signal at one or more of the presentation devices 510A, 510B, 510C, and 510D, so that the directionality of the presentation perceived by the audience A is distinct from the actual origination point(s).

Although the multiple audio signal presentation system and methods are described and shown in conjunction with a picture-in-picture application, embodiments of the present invention are not so limited, as they may be performed in the absence of any corresponding video signals or image display. Having illustrated and described the principles of our invention, it should be readily apparent to those skilled in the art that the invention may be modified in arrangement and detail without departing from such principles. I claim all modifications coming within the spirit and scope of the accompanying claims.

I claim:

1. A system comprising:
   a plurality of physically separated sound presentation devices to concurrently present a plurality of audio signals at separate physical locations, the plurality of audio signals comprising:
   a primary audio stream corresponding to a primary video stream; and a secondary audio stream corresponding to a secondary video stream;
a controller operable to manipulate one or more of the audio signals, direct a first subset of the plurality of physically separated sound presentation devices to present the primary audio stream at a first physical location, direct a second subset of the plurality of physically separated sound presentation devices to present the secondary audio stream at a second physical location that is physically separated from the first physical location, and perform a picture-in-picture application with a plurality of video signals, the plurality of video signals comprising the primary video stream and the secondary video stream; and
a single display to concurrently display the video signals according to the picture-in-picture application;
where one of the first and second subsets of the plurality of physically separated sound presentation devices is next to the display; and
where the other one of the first and second subsets of the plurality of physically separated sound presentation devices is across from the display.

2. The system of claim 1
where the plurality of physically separated sound presentation devices are operable to present the plurality of audio signals at corresponding presentment volumes; and
where the controller is further operable to adjust the presentment volume of at least one of the plurality of audio signals.

3. The system of claim 2 where the controller is further operable to set the presentment volumes of the audio signals to different intensity levels.

4. The system of claim 1 where the controller is operable to manipulate one or more of the audio signals in the frequency domain.

5. The system of claim 4 where the controller is operable to remove data from one or more of the audio signals at frequencies exceeding a frequency threshold.

6. The system of claim 4 where the controller is operable to clip one or more of the audio signals to include audible voice data.

7. The system of claim 4 where the controller is operable to occupy a first set of contiguous audible frequencies with the primary audio stream, and to occupy a second set of contiguous audible frequencies with the secondary audio stream.

8. The system of claim 7 where the lowest frequency in the second set is greater than or equal to the highest frequency in the first set.

9. The system of claim 1 where the first and second subsets are different.

10. The system of claim 1 where the controller is operable to direct the first and second subsets of the plurality of physically separated sound presentation devices to stereophonically present the primary and secondary audio streams, respectively, so that the presentations perceptively-appear to originate from locations that are spatially-distinct from any of the physically separated sound presentation devices.

11. A method comprising:
manipulating one or more of a plurality of audio signals, the plurality of audio signals comprising:
a primary audio stream corresponding to a primary video stream; and
a secondary audio stream corresponding to a secondary video stream; and
directing a first subset of a plurality of physically separated sound presentation devices to present the primary audio stream at a first physical location;
concurrently directing a second subset of the plurality of physically separated sound presentation devices to present the secondary audio stream at a second physical location that is physically separated from the first physical location;
performing a picture-in-picture application with a plurality of video signals, the plurality of video signals comprising the primary video stream and the secondary video stream; and
concurrently displaying the video signals on a single display according to the picture-in-picture application;
where one of the first and second subsets of the plurality of physically separated sound presentation devices is next to the display; and
where the other one of the first and second subsets of the plurality of physically separated sound presentation devices is across from the display.

12. The method of claim 11 further comprising adjusting a presentment volume of at least one of the audio signals.

13. The method of claim 12 further comprising setting presentment volumes of the audio signals to different intensity levels.

14. The method of claim 11 further comprising manipulating one or more of the audio signals in the frequency domain.

15. The method of claim 14 further comprising removing data from one or more of the audio signals at frequencies exceeding a frequency threshold.

16. The method of claim 14 further comprising clipping one or more of the audio signals to include audible voice data.

17. The method of claim 14 further comprising
occupying a first set of contiguous audible frequencies with the primary audio stream; and
occupying a second set of contiguous audible frequencies with the secondary audio stream.

18. The method of claim 17 where the lowest frequency in the second set is greater than or equal to the highest frequency in the first set.

19. The method of claim 11 where the first and second subsets are different.

20. The method of claim 19 further comprising stereophonically presenting the primary and secondary audio streams so that the presentations appear to originate from different perceived-origination points spatially-distinct from the sound presentation devices.

21. An apparatus including a non-transitory computer-readable medium containing computer instructions that, when executed, cause a processor or multiple communicating processors to perform a method comprising:
manipulating a plurality of audio signals, the plurality of audio signals comprising:
a primary audio stream corresponding to a primary video stream; and
a secondary audio stream corresponding to a secondary video stream;
directing a first subset of a plurality of physically separated sound presentation devices to present the primary audio stream at a first physical location;
concurrently directing a second subset of the plurality of physically separated sound presentation devices to present the secondary audio stream at a second physical location that is physically separated from the first physical location;

performing a picture-in-picture application with a plurality of video signals, the plurality of video signals comprising the primary video stream and the secondary video stream; and concurrently displaying the video signals on a single display according to the picture-in-picture application;

where one of the first and second subsets of the plurality of physically separated sound presentation devices is next to the display; and where the other one of the first and second subsets of the plurality of physically separated sound presentation devices is across from the display.

22. The apparatus of claim 1, the method further comprising adjusting a presentment volume of at least one of the audio signals.

23. The apparatus of claim 22, the method further comprising setting presentment volumes of the audio signals to different intensity levels.

24. The apparatus of claim 21, the method further comprising manipulating one or more of the audio signals in the frequency domain.

25. The apparatus of claim 24, the method further comprising removing data from one or more of the audio signals at frequencies exceeding a frequency threshold.

26. The apparatus of claim 24, the method further comprising clipping one or more of the audio signals to include audible voice data.

27. The apparatus of claim 24, the method further comprising
   occupying a first set of contiguous audible frequencies with the primary audio stream; and
   occupying a second set of contiguous audible frequencies with the secondary audio stream.

28. The apparatus of claim 27 where the lowest frequency in the second set is greater than or equal to the highest frequency in the first set.

29. The apparatus of claim 21, where the first and second subsets are different.

30. The apparatus of claim 29, the method further comprising stereophonically presenting the primary and secondary audio streams so that the presentations appear to originate from different perceived-origination points spatially-distinct from the sound presentation devices.

* * * * *